Nov. 8, 1932.                C. FIELD                 1,886,662
                        WIRE SHAVING MACHINE
             Original Filed June 18, 1927     8 Sheets-Sheet 1
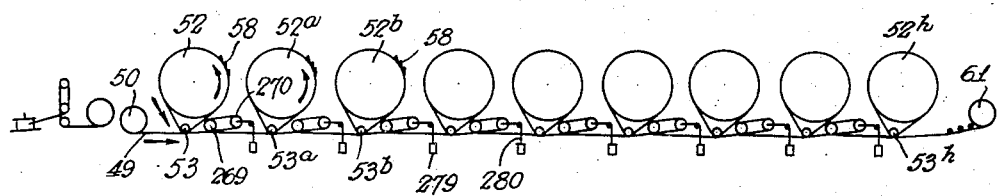
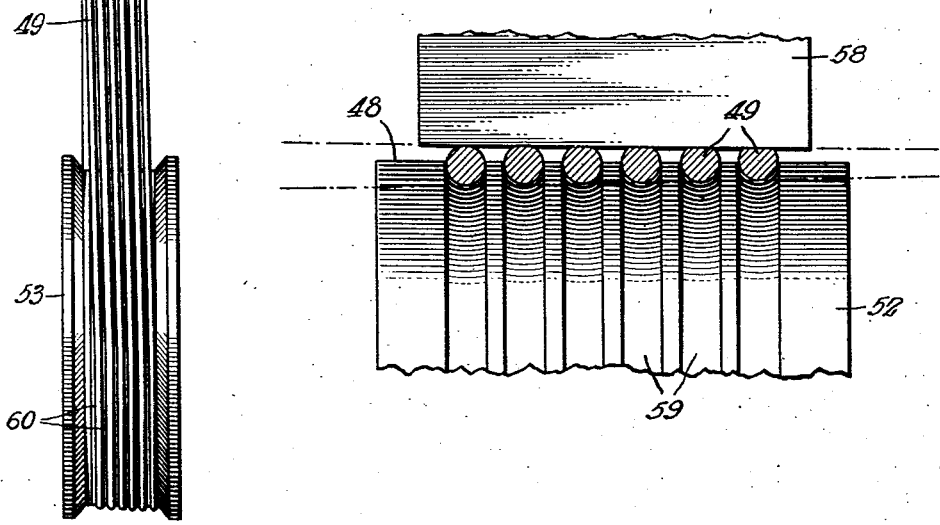
INVENTOR
Crosby Field
BY
ATTORNEY Nov. 8, 1932.    C. FIELD    1,886,662
WIRE SHAVING MACHINE
Original Filed June 18, 1927    8 Sheets-Sheet 2
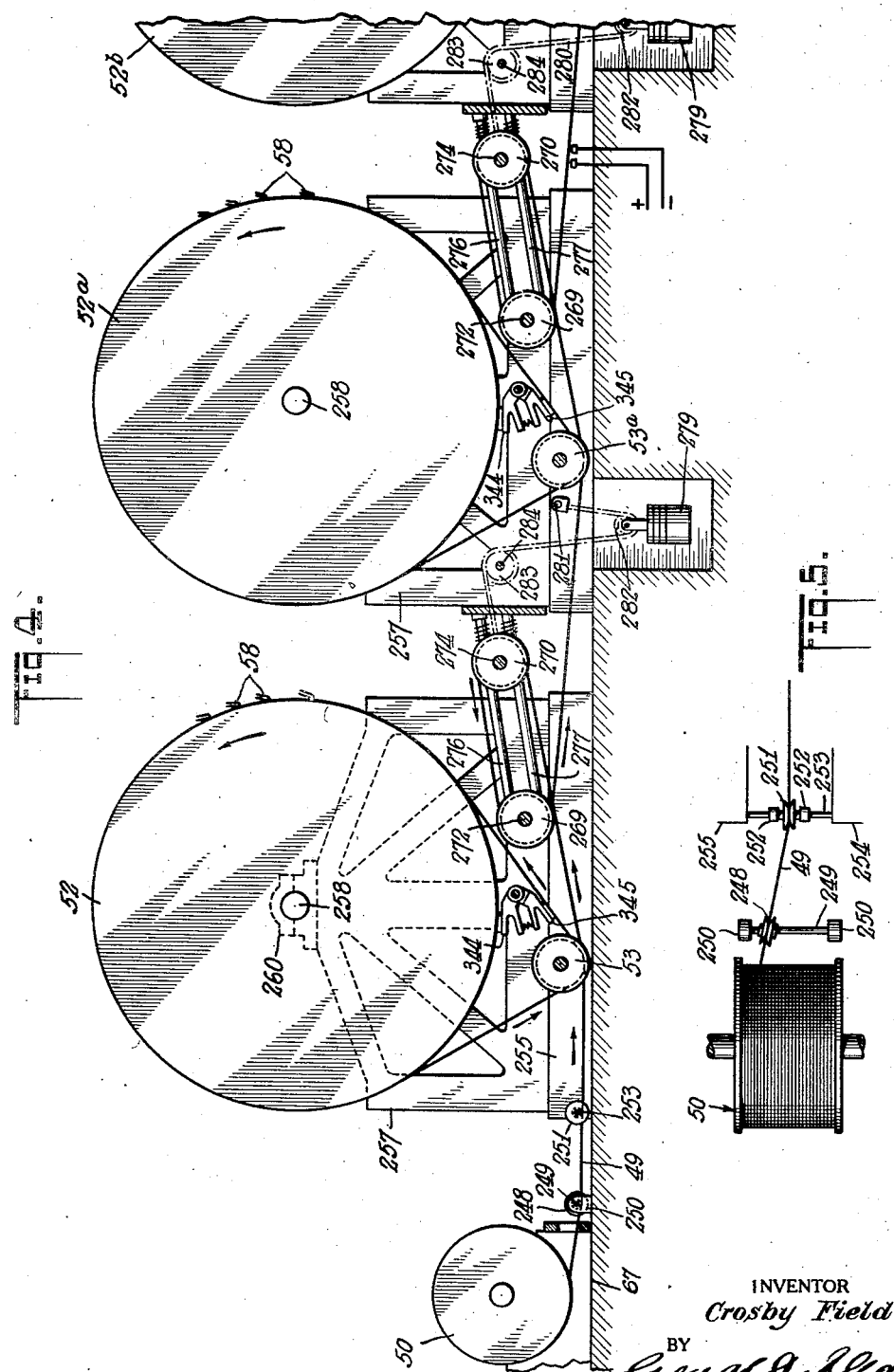
INVENTOR
Crosby Field
BY
ATTORNEY Nov. 8, 1932.  C. FIELD  1,886,662
WIRE SHAVING MACHINE
Original Filed June 18, 1927   8 Sheets-Sheet 3
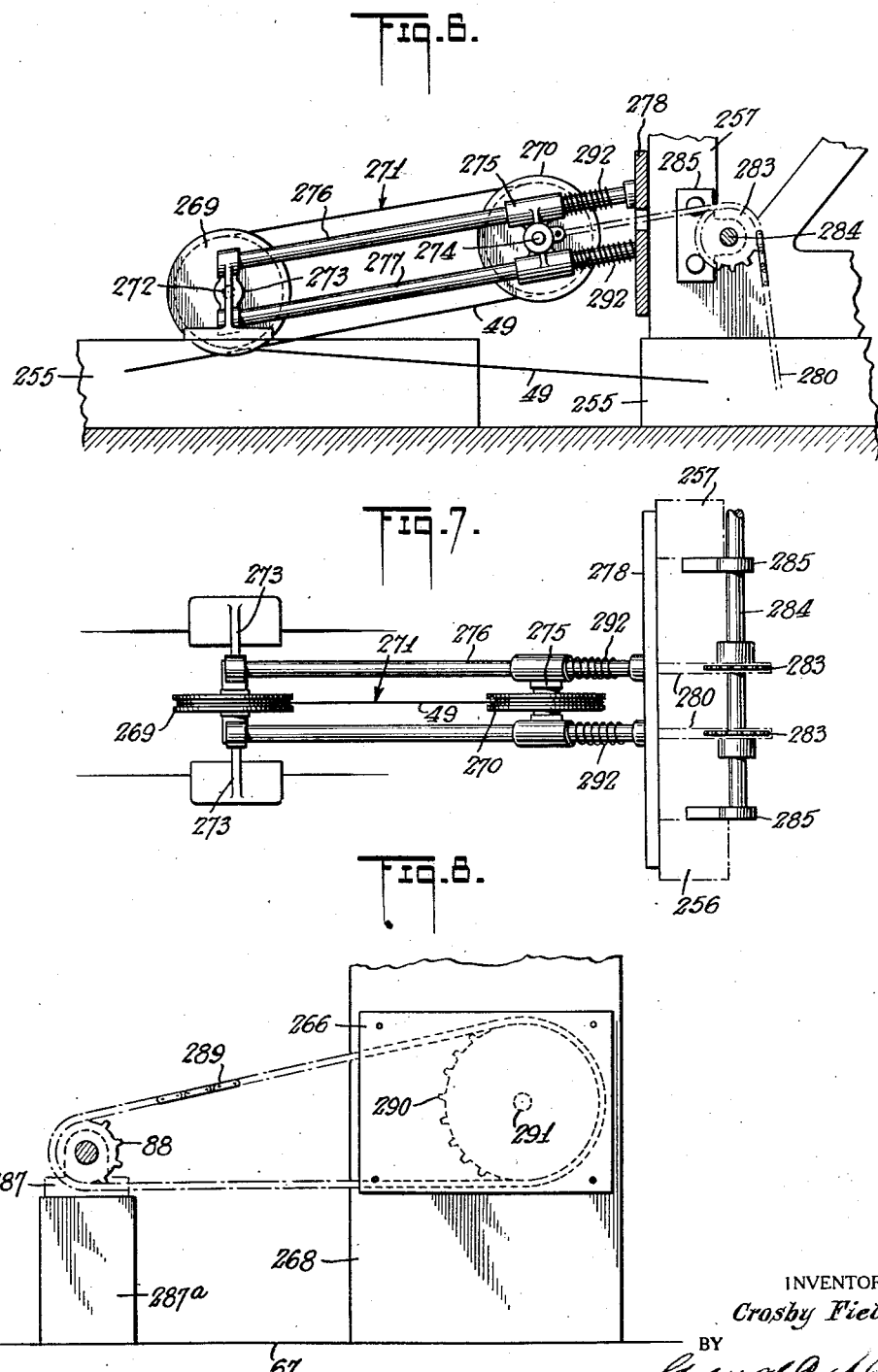
INVENTOR
Crosby Field
BY
ATTORNEY Nov. 8, 1932.                     C. FIELD                        1,886,662
                           WIRE SHAVING MACHINE
                  Original Filed June 18, 1927    8 Sheets-Sheet 4
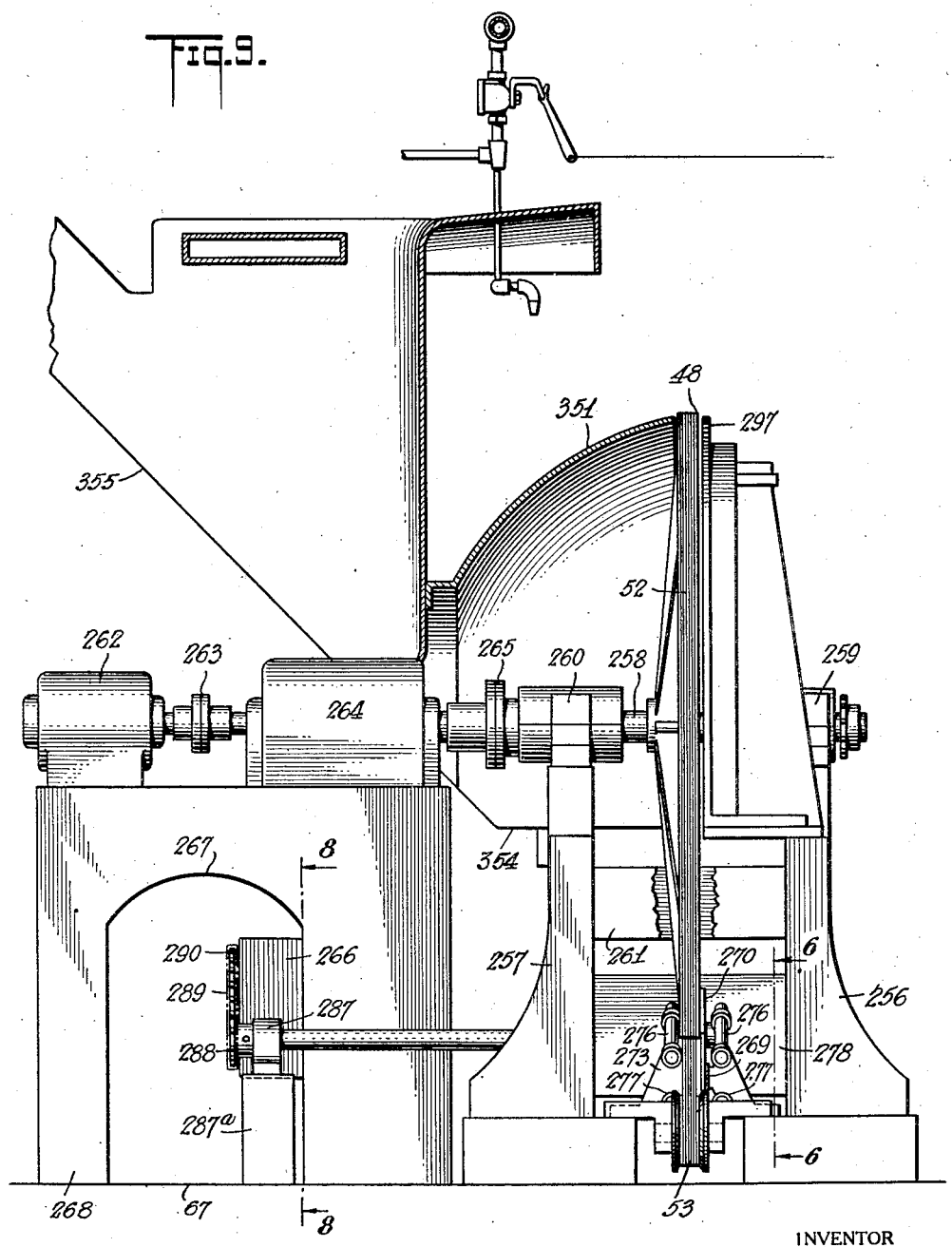
INVENTOR
Crosby Field
BY
ATTORNEY Nov. 8, 1932.  C. FIELD  1,886,662
WIRE SHAVING MACHINE
Original Filed June 18, 1927  8 Sheets-Sheet 5
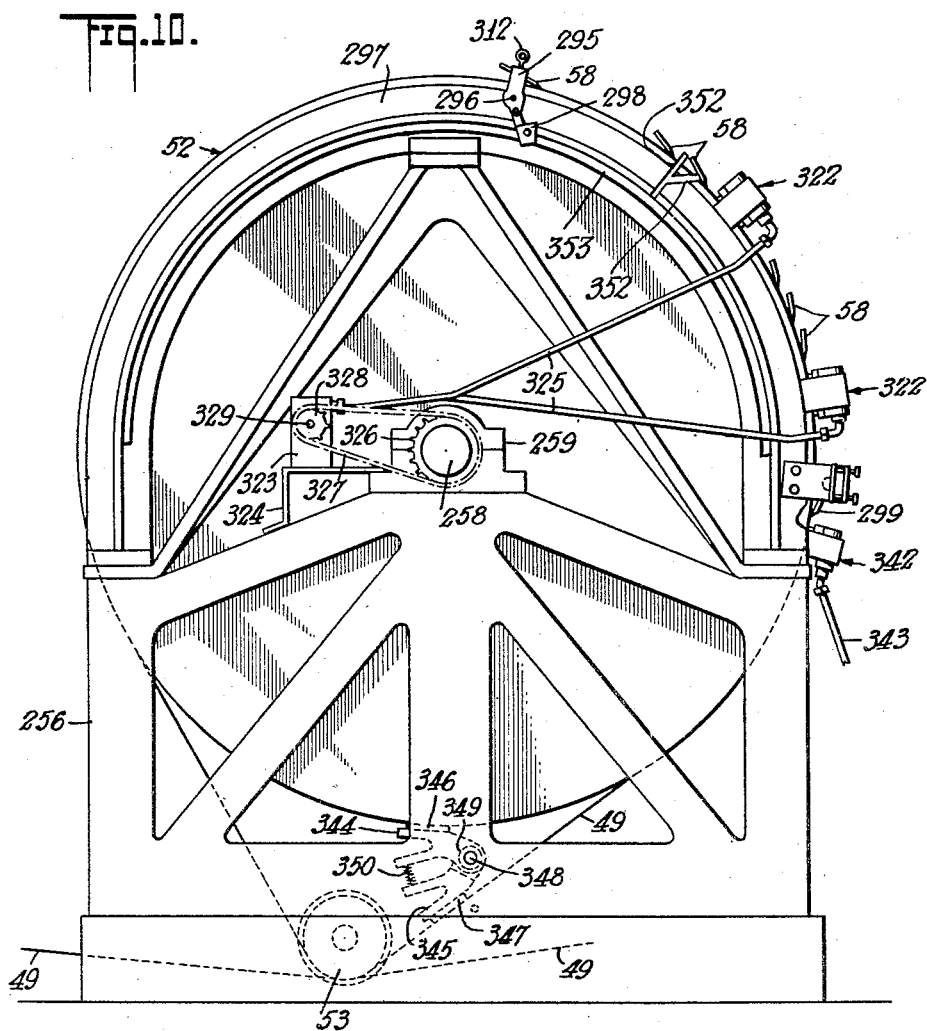
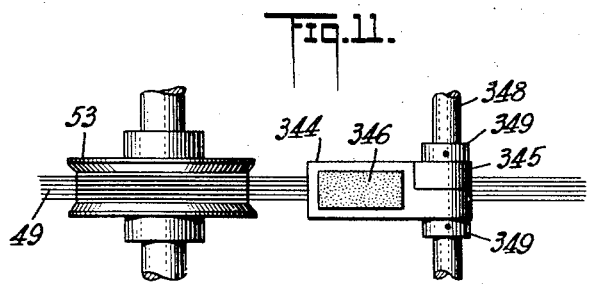
INVENTOR
Crosby Field
BY
ATTORNEY Nov. 8, 1932.   C. FIELD   1,886,662
WIRE SHAVING MACHINE
Original Filed June 18, 1927   8 Sheets-Sheet 6
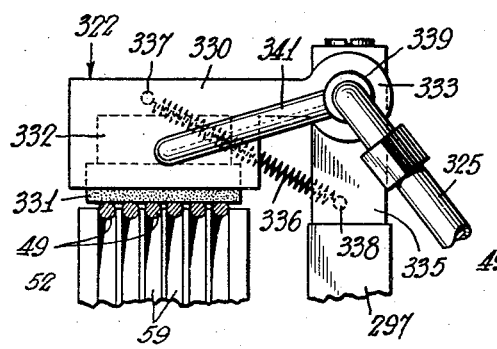
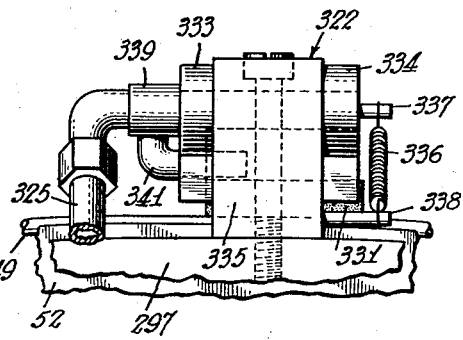
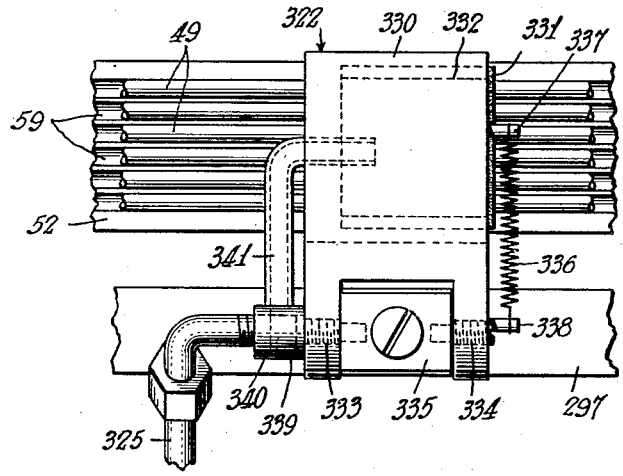
INVENTOR
Crosby Field
BY
ATTORNEY Nov. 8, 1932.                     C. FIELD                    1,886,662
                          WIRE SHAVING MACHINE
                  Original Filed June 18, 1927     8 Sheets-Sheet 7

INVENTOR
Crosby Field
BY
ATTORNEY

Nov. 8, 1932.   C. FIELD   1,886,662
WIRE SHAVING MACHINE
Original Filed June 18, 1927    8 Sheets-Sheet 8
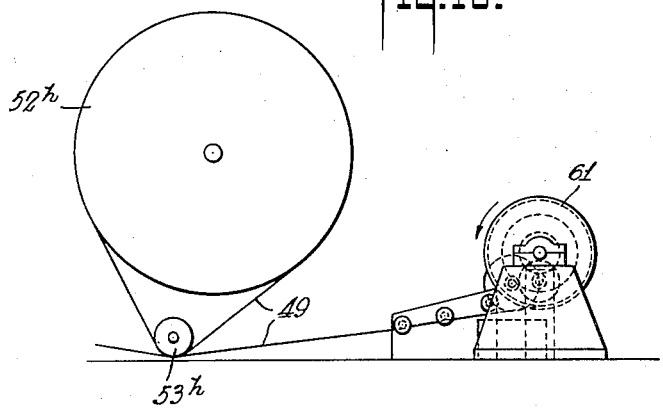
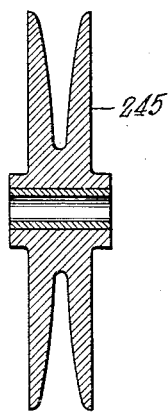
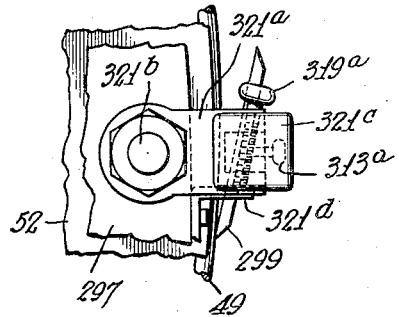
INVENTOR
*Crosby Field*
BY
*George A. Mead*
ATTORNEY Patented Nov. 8, 1932

1,886,662

UNITED STATES PATENT OFFICE

CROSBY FIELD, OF BROOKLYN, NEW YORK, ASSIGNOR TO BRILLO MANUFACTURING COMPANY, INC., A CORPORATION OF NEW YORK

WIRE SHAVING MACHINE

Original application filed June 18, 1927, Serial No. 199,692. Divided and this application filed August 3, 1928. Serial No. 297,314.

My present invention relates to automatic machines for producing metal wool and many of its important features are in the nature of improvements which may be used with or in place of related apparatus and parts disclosed in my Patent Nos. 1,608,478 and 1,608,481, dated November 23, 1926. In these machines, wire is drawn from a suitable source and is conducted through a series of successively arranged cutting or shaving units which operate upon the wire to produce the metal wool. In the preferred case, the wire from the last of these units is too thin to withstand the strain of shaving and is conducted to a reel on which it is wound in a coil to be disposed of as waste. Each of the cutting units includes a power driven, rotary bed in the form of a disc wheel having a plurality of adjacent grooves, formed in its periphery, in which the wire is held by friction in a plurality of parallel loops or strands and is carried by the wheel in operative relation to a series of cutters arranged around the periphery of the bed. As the wire leaves the last groove of each bed, it passes to the next succeeding bed where it enters the first groove thereof. Preferably, the wire passes in the loops and between the units, in single direction curves of greater or less radius but without reverse bending at any point.

Provision is made in the present invention to wrap the wire around a greater portion of each bed, substantially in advance of the first knife, which results in a much steadier operation of the machine. To this end, one of the features of the invention relates to the means which transfers the loops of wire from one bed groove to another and includes a single guide roller beneath each bed. The guide roller has parallel grooves corresponding with and in the same plane as the bed grooves, and the path of the wire is such that each length travelling from a roller to a bed groove lies in the same radial plane with the roller and bed groove, while each strand travelling from the bed to the guide roller slants across the radial planes.

The spaces between the grooves of the bed are considerably greater than in my prior machines, so that contact of the wires of the adjacent loops is avoided. This affords opportunity for the wires more readily to center themselves under the guidance of the guide roller and to retain their flat or cut surfaces parallel. This is important because when the wires lie close to each other, they are likely to come into contact due to vibration and dirt which may collect, and such contact is likely to result in a slight axial twist of the wires so that their flat cut surfaces are slightly twisted from parallelism with the cutting edges of the knives. By the increased separation of the grooves, the flanges between them can be made thicker and accordingly they wear much longer. By having the grooves in the bed thus separated, the adjacent strands of wire and the periphery of the bed including the grooves, may be readily cleaned of dust or shavings which would otherwise interfere with the operation of the machine.

Another feature of the invention relates to means for cleaning the wire and the periphery of the beds including the grooves therein. To this end, there may be provided a wiper or pad to engage the adjacent strands of wire on the sides which engaged in the grooves. Said wiper may be located in that portion of the loop which extends from the wheel bed to the guide roller. Said devices or wipers may be pivotally supported and are spring pressed, one against the periphery of the bed wheel and the other against the wire. Thus all dust and shavings are removed from the periphery of the bed wheel and from the wires. It will be understood by placing the adjacent strands of wire a considerable distance from each other, that the wiper, which may be of comparatively soft material such as felt, may extend a considerable distance around each strand for effective cleaning.

The diameter and corresponding peripheral length for each bed groove on each wheel is greater than for the preceding groove not only to keep the cut surfaces up to the same level across the periphery, but also to keep the intermediate loops tight on the wheel beds in spite of minute stretching by the 40 to 60 shaving knives that operate on each loop. This is important in my present machine, where the take-up mechanism hereinafter described keeps the end tension on the wire of each wheel closely limited to that necessary to keep only the first and last loop portions in proper non-slip engagement with the grooves. Though the difference in circumference between any two adjacent grooves is slight, it has an important effect in keeping the intermediate loops tight on the wheel.

Another feature of the invention relates to means to prevent undue stress on the wires between successive cutting units, and this includes means for keeping the bed wheels rotating at the same peripheral speed, preferably including elastic take up means permitting momentary slight difference in speed, as when the speed of a preceding bed is decreased as by increase in its load, which may be due to variation in the quality of different parts of the wire being operated upon. Said speed controlling means may include guide rollers to form elastically tensioned loops in the wire between successive wheels. Any variation in the speeds of adjacent bed wheels is effective to change the tension of the loop, and this is utilized to change the position of the loop forming guide roller, preferably causing the guide roller to slide in the plane of the loop, permitting the latter to lengthen and shorten within limits, maintaining approximately constant tension on the wire. This to and fro bodily movement of the guide roller or "dancer" roller is utilized to operate suitable mechanism to cause corrective change in the speed of one of the adjacent wheel beds. In the present form of the invention, each bed is driven by an electric motor, and each motor is controlled by a rheostat. The rheostat associated with the motor of the first bed may be hand adjusted or permanently fixed, while those associated with the motors of the succeeding beds are automatically controlled by the respective loops and dancer rollers in advance thereof. The mechanism operated by the dancer roller may include a chain extending over a sprocket wheel and operable against a suitable weight. The sprocket wheel being connected to a shaft rotated thereby, which shaft in turn is geared to the motor rheostat to adjust it.

As in my patents referred to, the knives which produce the shavings or wool are pivotally mounted and yieldingly held against the wire, preferably by suitably arranged weights adapted to counterbalance the thrust of the wire against the grooving edge of the knife. All pivotal movements of the knife are damped by inertia and friction so that chattering is prevented and, in normal operation, the knife is self-gaging as to depth of cut, smoothly floating on the wire which it is cutting. However, the wire sometimes has hard spots due to slag or other defects in manufacture. When such a hard spot reaches a cutter, the increased rearward thrust causes the knife to rise entirely out of contact with the wire instead of digging and cutting it off. An important feature concerns means for shaving off such uncut or defectively cut hard portions before the wire again comes under the knives. This is preferably a special planing cutter arranged in advance of each set of grooving cutters and adjusted so that it is ineffective so long as the grooving cutters operate normally to shave off the normal thickness of metal. When the grooving cutters begin to jump, the attendant throws them out of action and the special cutter becomes effective for shaving off the excess thickness of wire until the hard spot has passed and the grooving knives again put in operation. The special knife may be of very hard material such as stellite, to suit the specially hard metal it cuts. It is not unlike the wool cutting knives, being straight edged for the purpose of planing from each strand of wire, a flat ribbon-like shaving instead of thread-like shavings from the wool producing cutters.

In one form of the invention the special cutter is carried by a support on a fixed bracket, and the knife is adjusted with reference to the periphery of the bed by means of a support adjustable on the bracket.

An important feature of my invention depends on the discovery that the principle of floating, self-gauging operation which is so important for my grooved wool cutting knives, is also operative and advantageous in connection with the special planing knife for the hard spots even though the latter lacks one of the factors of self-gauging which is characteristic of the grooving knives, namely, the variation in width of cut simultaneously with variation in depth of cut, which is characteristic of a V-edged knife. In this form of invention, the planing knife is pivotally supported and is held in its operative position by a weight supported on a lever arm extending from the pivot, and adjustable lengthwise thereof, according to depth of the cut desired on the strands of wire. This mount is not full floating, gauge means being provided to limit movement of the knife toward the wire and the adjustment being such that the knife cannot cut so long as the wool producing cutters are operating normally to remove the usual thickness of metal. Within the range of float, however, the tendency of the wire as it advances past the knife, is to force it rearwardly away from the wire. This tendency is counterbalanced, however, to a greater or less extent by dig-in tendency of the blade and by the weight on the lever arm. Accordingly, for a given knife, the depth of the cut is dependent upon the position of adjustment of the weight along the lever arm, except as the depth of cut is limited by the gauge.

Another feature of the invention relates to the means for automatically supplying cutting oil or cooling agent for the cutters. The cutters are arranged in groups along the periphery of the bed and a plurality of lubricating devices are also located one in front of each group of cutters. A lubricant such as mineral oil is supplied from a pump having connections with all of the lubricating devices, the pump being geared to the bed so as to operate only while the bed is rotating.

Each lubricating device may include a cup-like element having a pad therein, the supply pipe being connected with said cup-like element to supply the lubricant to the pad, and the pad lying against the adjacent strands of wire that are looped around the bed.

In order that the pad may be swung away from the bed at will, the cup-like element is pivotally supported on a fixed bracket, suitable pressure means being provided against the action of which said element may be swung to its effective position. In order that swing may be made without disturbing the connection to the pump, the pump supply pipe enters an aperture in a stud forming a pivot for the cup-like element and from this aperture a tube extends into said cup-like element.

As different kinds of liquids are used for the wool producing knives and for the special planing knife, provison is made for supplying the liquids from two separate sources.

Fig. 1 is a diagrammatic front elevation of the machine;

Fig. 2 is an end view showing the loops of wire extending from the cylindrical bed to a roller beneath said bed for transferring the wire from one groove to another of the bed;

Fig. 3 is a detailed view showing the adjacent strands of wire in their respective grooves of the bed and their relation to the knife;

Fig. 4 is a sectional front elevation of the entrance end of the machine showing the path of the wire and the means for automatically controlling the speed of the beds;

Fig. 5 is a detail top plan view showing the manner of guiding the wire from the supply reel to the shaving machine;

Fig. 6 is a detail sectional elevation illustrating the mechanism, including a dancer roller, for controlling the speed of the beds, the section being taken on the line 6—6 of Fig. 9;

Fig. 7 is a top plan view of Fig. 6;

Fig. 8 is a detail sectional front view taken on the line 8—8 of Fig. 9;

Fig. 9 is an end view of one of the cutting units showing also the wool collecting hood and the means for removing the smoke and dust from the room;

Fig. 10 is a front elevation of one of the shaving units, including the rotating traction bed, and illustrates the means for lubricating the wire; it also shows a fixed cutter to remove the slag or other undesirable material from the wire, and cleaners or wipers for the wire and bed;

Fig. 11 is a detail top plan view of the wire cleaners;

Fig. 12 is an end view of one of the devices of the wire lubricating system;

Fig. 13 is a front elevation of Fig. 12;

Fig. 14 is a top plan view of Fig. 13;

Fig. 19 is a diagrammatic front view showing the means for conducting the wire from the bed at the exit end of the machine to the waste winding reel or drum;

Fig. 20 is a sectional view of one of the guide rollers used in conducting the wire through the machine; and Fig. 21 is a front elevation of another form of planing knife.

Figure 15:
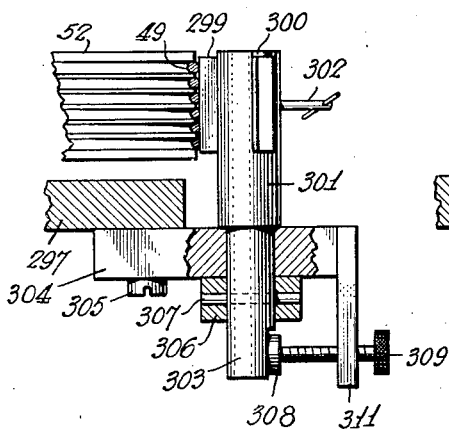
Fig. 15 is a top plan view, partly in section, of the planing knife or fixed cutter for removing the undesirable material from the wire.

In my present machine, as in my Patent No. 1,608,481, dated Nov. 23, 1926, a single wire 49 (Fig. 1) may be conducted in single curvature loops, without reverse bending, from a supply reel 50 (Figs. 1 and 4) through one or a succession of cutting units. The first unit includes a cylindrical bed 48 formed in the periphery of a traction wheel or disc 52, which is power driven in a manner hereinafter described. The wire is looped a number of times around the traction wheel 52 and a transfer guide roller 53, in successive parallel grooves 59, 60, and is then conducted to the next cutting unit by suitable guide means including roller 270, hereinafter described, for regulating the speed of the next succeeding wheel bed 52a, in accordance with the speed of said first bed. The wire passes in a loop around said take-up roller 270 and back around another roller 269, which is preferably non-slidable, whence it passes under the transfer guide roller 53a of said succeeding wheel bed 52a. The wire is then looped around the bed 52a and said transfer roller 53a a number of times, and is then looped around a third bed 52b and its transfer roller 53b and so on through as many cutting units as desired. Knives or cutters, 58, are arranged in series around the upper half of the periphery of each bed and extend transversely of the bed, so that each knife edge operates simultaneously on the adjacent loops or strands of the wire 49. The loops or strands lie in grooves, 59, formed in the periphery of the bed, as indicated in Fig. 3. These grooves constitute cutter beds supporting the wire in operative position for shaving by the knives. Each bed wheel is rotated in a direction to carry the wire in one direction loops, without reverse bending, as indicated by arrows in Figs. 1 and 4, so that the upper halves of the loops advance against the edges of the knives while traveling toward the supply end of the machine. The knives being grooved, as in my above mentioned patents, present V-toothed edges to the wire and these operate to cut from the wire a series of separate fiber-like lengths constituting the metal wool product of the machine.

The wire, in passing into the machine, is conducted to the first bed groove of the wheel, this being the groove at the extreme left in Figs. 3 and 9. As the loop of wire passes down from said groove to the transfer guide roller 53, it slants over (Fig. 2) and enters a second groove of the series of grooves 60. Said second groove of the transfer roller lies in the same plane as the second groove 59 of the bed wheel, so that the wire in passing back to the wheel from the guide roller 53, is conducted in a plane registering with the second groove 59 of said wheel 52.

Each time the wire is looped around the wheel bed, it is exposed to the cutting edges of all the knives 58, say 40 to 60 or more in number, and accordingly the wire becomes thinner as it advances through the successive loop paths from the first or entrance groove toward the front or exit groove of the bed, that is, from left to right in Fig. 3. In order to have each cutting edge operate simultaneously on the successively thinned strands, it is necessary to have the successive bed grooves and the cutting edge of the knife correspondingly nearer to each other, so that the space at the right (Fig. 3) is less than at the left.

I prefer to obtain the gradual decrease in space between the effective surfaces of the beds and the cutting edge of the knife by having the successive bed surfaces formed on circles of successively greater diameter, and if the wheel periphery is approximately cylindrical, this results in decreasing depths for the successive grooves 59. This permits having the cutting edge of each knife 58 arranged to operate substantially in the surface of a cylinder of appropriately larger diameter and, in most cases, approximately parallel with the axis of the bed shaft 52. With this arrangement of decreased depth of the grooves 59, the metal is removed across a cylindrical surface exactly transverse to the lengthwise curvature of the wire so that as the wire becomes flatter, it naturally continues to do all its bending and straightening in the same plane in which it was bent and set by the first groove of the machine, whereas an inclined cut surface would cause a twisting resultant for every change in curvature.

As the wire 49 advances successively from one groove to another, the slight increases of diameter of the cutter beds tends to retighten the wire. This is important, particularly where the end tension on the wire is only sufficient to maintain good working engagement of the first and last loops with the first and last grooves of each wheel. In such case, the very minute stretching of the wire by each circuit under the knives, would tend to loosen the intermediate loops, but this is compensated by the tightening due to the slight increase of peripheral length of the successive bed grooves.

After the wire has been operated upon at the last bed, 52h, it has been reduced to waste and passes under guide roller 53h to a winding reel 61.

The details of the supply reel, the waste reel and the operating means therefore are not more fully described herein, as they are not material to the subject matter here claimed. These elements are fully disclosed and claimed as part of the plant in the parent application Ser. No. 199,692, January 18, 1927, and are further claimed per se in another divisional application, Ser. No. 297,316, filed August 3, 1928, now Patent No. 1,826,758, granted October 13, 1931.

When the wire is fed from the reel 50 to the shaving machine (Figs. 4 and 5), it remains stationary on the shaft, or, in other words, does not feed laterally thereon. Accordingly, provision is made of means to guide the wire from the reel, which may include a roller 248 which is like the roller 245 (Fig. 20) having a deep groove in which the wire is guided. The roller 248 may be supported on a bar 249 carried by brackets 250 extending upwardly from the floor 67. From the roller 248, the wire is conducted to a similar roller 251, which is rotatably supported between fixed collars 252 on a bar 253 supported in foundations 254 and 255, upon which bed supporting frames 256 and 257 are located. From the last mentioned roller 251, the wire is conducted to the first groove in the guide roller 53 whence the wire extends to the bed 52. The walls of the hole, in the roller 248, through which the shaft 253 extends are curved so that said roller may traverse the rod and adjust itself, to the direction of the wire extending from the reel to the stationary guide roller 50, this direction varying as the wire unwinds from side to side of the reel.

The wheel bed 52 of each shaving unit may be secured to a shaft 258 supported in bearings 259 and 260 (Fig. 9) on the bed supporting frames 256 and 257, which are located respectively at the front and rear of the bed, said frames being connected to each other to increase their rigidity by bars 261.

The bed wheels are rotated by electric motors 262, each motor being connected through a coupling 263 with a gear transmission device 264 connected with the wheel shaft 258 by a coupling 265. The gear transmission device is designed to have a great speed-reducing, torque-multiplying ratio, so that the wheel bed may be driven at proper cutting speed, by means of the high speed motor 262. To control the speed of the wheel beds, I provide a separate rheostat connected in the field of each motor 262. The rheostat for the first wheel bed is manually operated and rheostats 266, for the succeeding wheel beds, are automatically operated, as will be explained. Each rheostat is located in an arch 267 formed in a foundation 268 extending upward from the floor 67 to support its motor 262 and the transmission device 264.

The means which prevents undue stress on the wire extending between the cutting units, may include a stationary roller 269 (Figs. 4, 6, 7 and 9) and a movable or dancer roller 270, around which rollers the wire is wrapped to form a take-up loop 271. The stationary roller 269 may be rotatably supported by a shaft 272 on brackets 273 secured to the foundations 254 and 255. The dancer roller 270 may be supported by a shaft 274 in brackets 275, slidingly supported on upper guide rods 276 and lower guide rods 277, all of the guide rods being supported at their lefthand ends (Figs. 6 and 7) in the brackets 273 and at their righthand ends in a bar 278 secured to the drum supporting frames 256 and 257. The guide rollers may be grooved as shown to prevent rubbing where the wire crosses near the roller 269.

When the load is increased on any wheel, as for instance, the first wheel 52 (Fig. 4), which may result from varying hardness of the material in different parts of the wire, there is a tendency to reduce the speed of that wheel. The second wheel being then operating under normal conditions, at unreduced speed, the tension tends to increase because the wire is being drawn from the loop faster than it is being supplied thereto. Slightly increased tension draws the dancer roller 270 bodily toward the stationary roller 269, against the action of suitable tensioning means. Such means which may include an adjustable weight 279 operating on one or more sprocket chains 280, one end of each sprocket chain being secured to a fixed bar 281, and each chain extending downwardly around the guide roller 282 which carries the weight 279. From the guide roller 282, the chain extends upwardly over a sprocket 283 and is then connected to the bearing bracket 275 which supports the dancer roller 270. The sprockets 283 are secured to a shaft 284 supported in fixed brackets 285 secured to the frames 256 and 257. Thus the variations in tension and size of the take-up loop cause the dancer roller 270 to move back and forth and such movements of the roller cause partial rotations of the shaft which are utilized to effect corresponding adjustments of the field rheostat of the motor which drives the next succeeding or second wheel 52a, thereby varying the speed of said second wheel by and in accordance with increase or decrease of speed of the first wheel. On the other hand, if the second wheel slows down while the first wheel keeps on at normal speed, the intervening take-up loop lengthens, thereby increasing current supply to the second wheel and bringing it back to normal speed, regardless of its increased load. Thus the first or hand adjusted wheel sets the normal speed, controlling speed of the second wheel.

To connect the shaft 284 with the rheostat 266, the shaft extends rearwardly where it is supported in a bearing 287 on a block 287a extending up from the floor 67. A sprocket 288 (Figs. 8 and 9) secured to said shaft, is connected by means of a chain 289 to a sprocket 290, secured to a shaft 291 of the rheostat. By turning this shaft in either direction, the rheostat is adjusted to increase or decrease the speed of the motor 262 and consequently the speed of the bed. To prevent injury to the dancer roll mechanism when a break in the wire releases tension on the dancer roll, I provide buffer springs 292 coiled round the guide rods 276 and 277. These absorb the shock when the dancer roll is suddenly pulled towards the supporting bar by the then unbalanced pull of the weight 279.

The speed of each succeeding wheel throughout the machine, is controlled by a rheostat which is automatically adjusted by a take-up means such as above described, located between it and the preceding wheel. Thus, differences in load resulting in differences of speed and resulting tension on the intermediate portions of the wire are utilized to adjust the power of the motor of the following bed, thereby regulating its speed and closely limiting the variation of tension between the beds.

The final wheel may similarly control the speed of the winding reel at the exit end of the machine by means of an interposed take-up loop and dancer roll mechanism, but the field rheostat operated thereby is preferably in series with a hand controlled rheostat operated from a central control station and the hand control being entirely practical, automatic control by the dancer roll and loop may be dispensed with.

The grooving knives, 58, may be like those in my above mentioned patent. They are arranged in groups around the periphery of the bed wheel as indicated in Fig. 10, where the size of the knives is somewhat exaggerated for clearness of illustration. Each knife is supported in a holder or bracket, 295, mounted to swivel about a pivot 296 on a semi-circular frame 297 extending adjacent the upper or cutter bed portion of wheel 52 and supported on the main frame 256. Each knife holder has connected thereto a weight, 298, which tends to force the cutting edge of the knife toward the wire which is supported in peripheral bed grooves.

Figure 16:
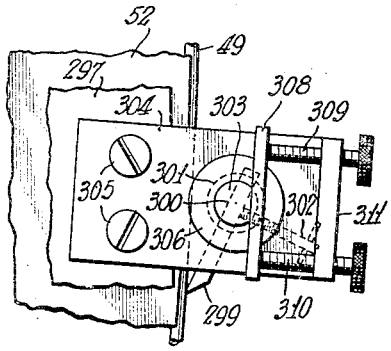
Fig. 16 is a front view of Fig. 15.

When particularly hard spots in the wire reach the knives 58, said knives tend to rise or jump, with the result that they do not produce the desired quality of shavings and, in fact, do not do enough cutting of any kind to be at all effective in removing said hard spots. To take care of this, I provide for each bed a special cutter or planing knife, 299 (Fig. 10), located preferably in advance of the grooving knives and arranged to operate as a gauge cutter for removing any undue thickness of metal from each loop of wire, before it again passes to said grooving knives. This gauge planer 299 may be located in a slot, 300 (Figs. 15 and 16), of a knife holder 301, and may be secured to said holder by a set screw 302. The holder is provided with a reduced shank 303, extending through a bracket 304 which may be secured to the cutter supporting frame 297 by screws 305. The holder 301 may be secured to bracket 304 by a collar 306, which may be secured to the shank 303 by a pin 307. The shank 303 of the knife holder is provided with a cross bar 308, constituting two arms extending to opposite sides of said shank. These arms may be engaged by set screws 309, 310 supported by an extension 311 of the fixed bracket 304. By manipulating the set screws 309, 310, the knife holder may be rotated slightly about its axis to adjust the cutting edge of the knife 299 to the loops of wire on the bed. The planing knife is of sufficient width to engage all of the adjacent loops of wire on the bed and, when properly set, it does not touch the wire, so long as the grooving cutters 58 are functioning properly to remove the normal amount of metal. As soon as the attendant notices jumping of these cutters, he may swing them out of action where they may be held by suitable detents 312, which drop into apertures, not shown, in the periphery of the knife supporting frame 297. As soon as said grooving cutters are thrown out, the thickness of each loop reaching the planing knife 299 becomes correspondingly greater than normal, and the excess thickness that would ordinarily be removed by the grooving cutters 58 is presented to the special cutter 299, which planes a ribbon-like shaving from each loop, thus removing the undesirable material from the wire and reducing the wire to normal thickness. After this has been done, the wool producing cutters may again be rendered effective.

Figure 17:
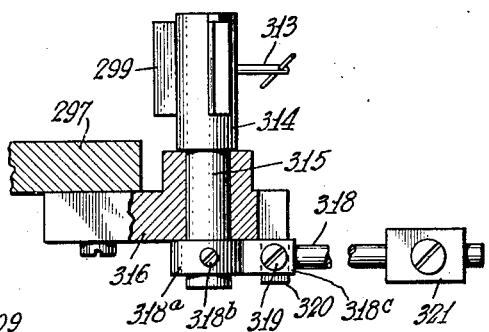
Fig. 17 is a top plan view of a modified form of planing knife.
Figure 18:
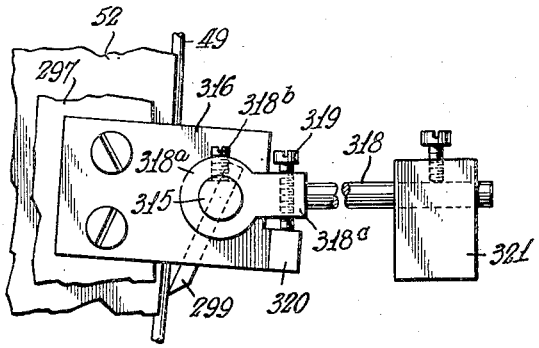
Fig. 18 is a front view of Fig. 17.

The planing knife may be mounted to operate as a fixed gauge cutter, but in such a way that it may be instantly thrown into or out of operative relation to the wire, as indicated in Figs. 17 and 18, wherein the planing knife 299 is secured in a holder 314 by lock-screw 313, said holder including a pivotal shank 315 which extends through a bracket 316 secured to the knife supporting frame 297. An arm 318 is secured to the shank by collar 318a and key-screw 318b. The collar has a radial projection 318c for an adjustable gauge screw 319 which bears against a fixed stop 320, extending from the bracket 316. The direction of thrust on the knife holder is such that it has little or no floating tendency, but it is free to be pivoted instantly away from the wire 49 on the bed 52. The limit of movement of said knife towards the bed is accurately gauged by the set screw 319. The weight 321 functions mainly as an inertia mass to steady the knife in its gauging position and to return it to said position.

While the planing knife may be mounted to operate as a fixed cutter, I prefer to have it mounted as a floating knife which will pivot away from the wire under excessive thrust and which tends to be automatically self-gauging for constant depth of cut, after the manner of the wool-grooving cutters. One such arrangement is shown in Fig. 21, where the knife 299 is secured in a holder 321a by a clamping screw 313a, the holder being mounted on a pivot 321b secured to the knife supporting frame 297. As in the case of the wool cutting knives, the pivot is designed to afford frictional opposition to all pivotal movements and there is a weight 321c to oppose pivotal movements away from the wire. In the present case, however, movement of said knife towards the bed is limited by the adjustable gauge screw 319a, engaging stop 321d. As the tendency to thrust the knife away from the wire increases with the thickness of the shaving being cut, the thickness of the shaving to be removed may be controlled by the adjusting of the counter-balancing weight. Thus I provide a positive gauge stop in combination with a knife which is capable of floating or self-gauging operation within desired limits and which is effective to cut a ribbon-like shaving from the wire, whenever its thickness is greater than the normal for which the gauge screw is set.

A lubricating or cooling agent, such as mineral oil, is supplied to the cutters, by applying it to the strands of wire. Such a lubricating system may include a plurality of lubricating devices, 322 (Fig. 10), one in advance of each group of cutters 58. A pump 323 of any suitable construction is supported on a bracket 324 on the main frame 256 and operates to force the lubricating agent through supply pipes 325 to said lubricating device 322. Preferably, pump 323 operates only when the bed 48 is rotating. Its driving means includes a sprocket 326 on the wheel supporting shaft 258. This sprocket drives a chain 327 connected with a sprocket 328 which rotates the pump shaft 329 and thus operates the pump to force the lubricant through the supply pipe 325 to said lubricating devices.

Each lubricating device, 322 (Figs. 12, 13 and 14) may include a cup-like element, 330, having secured therein a pad 331, which may be of felt, and to which the lubricant is supplied from a chamber 332 in said cup-like element, the lubricant being supplied to said chamber in a manner hereinafter described. The lubricating device is held resiliently against the lengths of wire 49 so that as they advance past said lubricating device, they are wiped by the pad 331, which is saturated with the lubricant. To resiliently hold said device against the wire, the cup-like element is supported by pivots 333 and 334 on a fixed bracket 335 which may be secured to the knife carrying frame 297, and a spring 336 is connected to a pin 337 of the cup-like element 330 and to a pin 338 of the bracket 335 to hold the pad of the lubricating device against the strands of wire. This arrangement enables the lubricating device to be thrown out of action by swinging the cup-like element upwardly about its pivot. To conduct the lubricant from the supply pipes 325 to the chamber 332, the pivot 333 may be provided with a head 339 having an aperture 340 in which the end of the supply pipes 325 is received. A tube 341 conducts the lubricant or liquid from the aperture 340 of the pivot stud to the chamber 332. Thus with this arrangement, the cup-like element may be swung about its pivot without disturbing the lubricant supply connection. It will be noticed in Fig. 14 that the end of the supply pipe is threaded into the head 339. This threading is loose enough to enable the head to rotate on the end of the supply pipes when the lubricating device is swung out of or into position.

A lubricating device 342 which may be constructed like the lubricating devices 322 is provided for the planing knife 299, and may be secured to the knife carrying frame 297. Since the work done by the planing knife 299 is considerably greater than the work done by anyone of the wool producing knives 58, it is desirable to use a different kind of cooling or lubricating agent. Accordingly, provision is made to supply the liquid from a separate source, which may be done by means of a pump, not shown, connected to said lubricating device 342 by a supply pipe 343.

To clean the grooves 59 in the periphery of the traction beds and also the loops of wire, wipers 344 and 345, respectively (Figs. 10 and 11), are provided at each bed. The wiper 344 is provided with a pad 346 which lies against the periphery of the bed; said pad may be of comparatively soft material, such as felt, so as to embed itself in the grooves. The wiper 345 is also provided with a pad 347, of comparatively soft material, and the loops being spaced considerable distances from each other, the pads engage a considerable portion of the circumference of the wire. The wipers are pivotally supported on a rod 348 extending between the frames 256 and 257. The wipers may be held in position lengthwise of said rod, in alignment with the bed and the loops of wire, by suitable collars 349. A spring 350 may be located between the wipers to separate them and force the wiper 344 against the periphery of the bed and the wiper 345 against the loops of the wire. It will be understood that the loops of wire extend from the bed at one side, downwardly towards and around the guide roller 53 and then upwardly back to the bed, and it is in this portion of the loops where the wipers are preferably located, so that the one may conveniently engage the periphery of the bed, while the other engages the surfaces of the wire that contact with the bed grooves. Thus the grooves and the wires are kept clean by brushing shavings and dust from each of them between every passage under the grooving knives.

The lubrication is under the subject matter of a separate divisional application, Ser. No. 297,318, filed August 3, 1928.

To collect or gather the wool, there is provided at each bed a hood 351 (Fig. 9). Each hood is concave and extends rearwardly from the periphery of the wheel bed so as to receive the wool as it is blown away from the cutters by air jets 352, which are supplied through a pipe 353, as indicated in Fig. 10; and also in Fig. 34 of parent App. Ser. No. 199,692. The wool is conducted by said hood into pockets 354, one at each side thereof, where it accumulates. Each hood also serves as a protector for the bearing 260 of the bed shaft (Fig. 9).

To convey the wool away from the machine, to a place where it may be readily accessible for storage or packing, I provide, at each pocket 354, an inclined chute 355, extending upwardly to an opening (not shown) in the wall of the room. The wool may be elevated, by suitable means not material to the present invention, and therefore not described. The conveyor is claimed as an element in the combination, made the subject matter of the parent application, Ser. No. 199,692, filed June 18, 1927, of which this is a division. The conveyor is claimed per se in the companion division of said parent application, Ser. No. 297,317, filed August 3, 1928.

The wire tension regulating means, while fully disclosed herein, is claimed per se in another divisional application Ser. No. 297,315, filed August 3, 1928. The electric control arrangement is not more fully here described as it is not material to the invention here claimed, but is the subject matter of another divisional application, Ser. No. 297,319, filed August 3, 1928.

To string or thread the wire around the series of beds, the end of the wire is fastened to strong flexible cable of the "aeroplane" type, which is passed around the first bed or wheel 52, the cable due to its flexibility seating itself in the bed grooves, more readily than the wire 49, particularly if the wire be heavy. The free end of the cable is pulled by hand, so that just the proper tension is produced on the wire, and is passed around the guide rollers 53, 269 and dancer rollers 270 and proceeds from bed to bed. As the operator keeps the cable taut by hand, all the beds and rollers of the cabled bed and the latter may be operated at a slow speed, about 10 to 30 feet per minute. As the wire wraps around a bed, the dancer roller preceding it moves away from the buffer springs 292 to a normal running position or the buffer springs may follow the dancer rolls as in Fig. 6. In case there should occur a break in the wire, the ends of the wire are brought together at a convenient place and welded end to end and the slack, if any, is taken out of the wire, after which the beds may again be started for cutting.

I claim:—

1. A machine for making steel wool, including two circular beds, around each of which a wire is conducted to form a multiplicity of loops, the wire extending from the exit side of one bed to the entrance side of the other bed, a plurality of grooved shaving knives to produce a series of shavings from each loop of wire, mounted for active and inactive engagement with said wire and a planing knife associated with the first bed which is normally ineffective but which becomes effective to cut a ribbon-like shaving from each wrap when the grooved knives are in inactive engagement with said wire.

2. A machine for converting wire into metal wool including a power driven traction rotor around which the wire is tightly looped, a series of associated cutting tools, means producing air jets adjacent the cutting tools, and an auxiliary cutting tool out of the range of said air jets and coacting with the looped wire to remove undesirable metal therefrom.

3. A machine for converting wire into metal wool including a power driven traction rotor around which the wire is looped, cutting tools coacting with said rotor, wiper means to remove dirt and chips from the rotor and from the wire as the latter moves toward the former, means for feeding cutting fluid to said tools, and means generating air jets for blowing the moistened wool strands away from the tools.

4. A machine for converting wire into metal wool including a power driven traction rotor around which the wire is looped, cutting tools coacting with said rotor, wiper means to remove dirt and chips from the rotor and from the wire as the latter moves toward the former, means for feeding cutting fluid to said tools, means generating air jets for blowing the moistened wool strands away from the tools, and support means for sustaining the wool strands produced.

5. A machine for converting wire into metal wool including a series of power driven traction rotors, metal wire wound in loops about the successive rotors, to be converted into wool in a single pass through the machine, cutting tools coacting with said rotors, means wiping dust or chips from each rotor bed and from the wire fed thereto, means producing air jets directed adjacent said cutting tools, and an auxiliary cutter to remove undesirable metal from the wire, said auxiliary tool being at a distance from said cutting tools and beyond the range of said air jets.

6. A machine for converting wire into metal wool comprising a succession of traction rotors, each having grooves in its periphery engaged by successive loops of the same wire, separate electric motors for driving the several rotors, stationary grooving cutters coacting with said rotors for producing the wool, wiper means in advance of the knives of each rotor for removing dirt and chips from the rotor bed and from the wire, and tension control means interposed between each traction rotor and its neighbor to determine the operation of the respective motors for preventing wire rupturing differences in the speeds thereof.

7. A machine for converting wire into metal wool comprising a succession of traction rotors, each having grooves in its periphery, engaged by successive loops of the same wire, separate electric motors for driving the several rotors, stationary grooving cutters coacting with said rotors for producing the wool, wiper means in advance of the knives of each rotor for removing dirt and chips from the rotor bed and from the wire, means for lubricating the cutters, and tension control means interposed between each traction rotor and its neighbor to determine the operation of the respective motors for preventing wire rupturing differences in the speeds thereof.

8. A machine for reducing wire to metal wool and scrap, including a series of power driven traction rotors, a supply reel beyond the first of said rotors from which a wire is looped about said rotors successively, a winding reel beyond the last of said rotors to collect the scrap therefrom, grooving cutters coacting with the several rotors, separate electric motors for driving the several rotors, wire tension control means interposed between each traction rotor and its neighbor for controlling the circuit of the corresponding motor, to prevent wire rupturing differential speeds thereof, means lubricating the wire and the several cutters, and wiper means for removing dirt and chips from each loop of wire as it is about to pass upon a traction rotor and for simultaneously cleaning the contiguous bed surface of the rotor.

9. A machine for reducing wire to metal wool and scrap including a series of power driven traction rotors, a supply reel beyond the first of said rotors from which a wire is looped about said rotors successively, a winding reel beyond the last of said rotors to collect the scrap therefrom, grooving cutters coacting with the several rotors, separate electric motors for driving the several rotors, wire tension control means interposed between said traction rotors for governing the operation of motor of one traction rotor from the speed of another traction rotor to prevent wire-rupturing differential speeds thereof, means lubricating the wire and the several cutters, and wiper means for removing dirt and chips from each loop of wire as it is about to pass upon the traction rotor and for simultaneously cleaning the contiguous bed surface of the rotor, and air jet producing means adjacent to and blowing upon each of the cutting edges.

10. In a machine for making metal wool from wire, a wire supporting bed, a multiplicity of grooving cutters each yieldingly mounted for self adjusting engagement with the wire, and adapted for movement to relatively inactive position, in combination with a gauge cutter constructed and arranged to shave off excess thickness of the wire left by said grooving cutters when relatively inactive.

11. A machine for making metal wool from wire, including a plurality of groove supports for the wire and sets of grooving cutters arranged to operate simultaneously on successive lengths of the same wire, in combination with a cutter between said successive sets of grooving cutters normally out of contact with the wire cut by said grooving cutters but arranged to act as a gauge cutter to cut a ribbon-like shaving from the wire when the metal removed from the wire by the preceding set of groove cutter is less than normal, by a predetermined amount.

12. A machine for making metal wool from wire, including a plurality of groove supports for the wire and sets of grooving cutters arranged to operate simultaneously on successive lengths of the same wire, in combination with a cutter between said successive sets of grooving cutters normally out of contact with the wire cut by said grooving cutters but arranged to act as a gauge cutter to cut a ribbon-like shaving from the wire when the metal removed from the wire by the preceding set of groove cutter is less than normal, by a predetermined amount, the means of supporting said gauge knife being a pivoted holder with means tending to force the knife toward the wire sufficiently to take the thrust applied in cutting said ribbon-like shaving, and means to limit the movement of the knife toward the groove support for the wire to limit the thickness of said ribbon-like shaving.

Signed at New York in the county of New York, and State of New York this 31st day of July, A. D. 1928.

CROSBY FIELD.